US011138760B2

(12) United States Patent
Carlsson et al.

(10) Patent No.: US 11,138,760 B2
(45) Date of Patent: Oct. 5, 2021

(54) DISPLAY SYSTEMS AND METHODS FOR CORRECTING DRIFTS IN CAMERA POSES

(71) Applicant: Varjo Technologies Oy, Helsinki (FI)

(72) Inventors: Thomas Carlsson, Vantaa (FI); Ville Timonen, Espoo (FI)

(73) Assignee: Varjo Technologies Oy, Helsinki (FI)

( * ) Notice: Subject to any disclaimer, the term of this patent is extended or adjusted under 35 U.S.C. 154(b) by 217 days.

(21) Appl. No.: 16/675,492

(22) Filed: Nov. 6, 2019

(65) Prior Publication Data

US 2021/0134013 A1    May 6, 2021

(51) Int. Cl.
| | |
|---|---|
| *G06K 9/00* | (2006.01) |
| *G06T 7/80* | (2017.01) |
| *G06T 7/70* | (2017.01) |
| *G06F 3/01* | (2006.01) |
| *H04N 13/246* | (2018.01) |

(52) U.S. Cl.
CPC ............... *G06T 7/85* (2017.01); *G06F 3/011* (2013.01); *G06T 7/70* (2017.01); *H04N 13/246* (2018.05); *G06T 2207/30244* (2013.01)

(58) Field of Classification Search
CPC . G06T 7/70; G06T 2207/30244; G06F 3/011; H04N 13/246
See application file for complete search history.

(56) References Cited

U.S. PATENT DOCUMENTS

| | | | | |
|---|---|---|---|---|
| 6,064,749 | A * | 5/2000 | Hirota | G06F 3/011 345/7 |
| 6,522,787 | B1 * | 2/2003 | Kumar | G06T 15/10 348/E5.022 |
| 2001/0043738 | A1 * | 11/2001 | Sawhney | G01S 5/163 382/154 |

(Continued)

*Primary Examiner* — Shervin K Nakhjavan
(74) *Attorney, Agent, or Firm* — Ziegler IP Law Group, LLC

(57) ABSTRACT

A display system and method for correcting drifts in camera poses. Images are captured via camera, and camera poses are determined in global coordinate system. First features are extracted from first image. Relative pose of first feature with respect to camera is determined. Pose of first feature in global coordinate system is determined, based on its relative pose and first camera pose. Second features are extracted from second image. Relative pose of second feature with respect to camera is determined. Pose of second feature in global coordinate system is determined, based on its relative pose and second camera pose. Matching features are identified between first features and second features. Difference is determined between pose of feature based on first camera pose and pose of feature based on second camera pose. Matching features that satisfy first predefined criterion based on difference are selected. Correction transform that, when applied to second camera pose, yields corrected second camera pose is generated, such that corrected differences between poses of matching features based on corrected second camera pose and corresponding poses of matching features based on first camera pose satisfy second predefined (Continued)

criterion. Correction transform is applied to second camera pose. Second image is processed, based on corrected second camera pose, to generate extended-reality image.

20 Claims, 5 Drawing Sheets

(56) References Cited

U.S. PATENT DOCUMENTS

| | | | | |
|---|---|---|---|---|
| 2002/0145660 | A1* | 10/2002 | Kanade | G03B 41/00 |
| | | | | 348/36 |
| 2010/0208057 | A1* | 8/2010 | Meier | G06T 15/00 |
| | | | | 348/135 |
| 2011/0194731 | A1* | 8/2011 | BenHimane | G06T 7/246 |
| | | | | 382/103 |
| 2014/0184747 | A1* | 7/2014 | Valente | H04N 5/23222 |
| | | | | 348/46 |
| 2014/0293016 | A1* | 10/2014 | Benhimane | G06T 17/00 |
| | | | | 348/50 |
| 2019/0147619 | A1* | 5/2019 | Goldman | B64C 39/024 |
| | | | | 382/154 |
| 2020/0327695 | A1* | 10/2020 | Lin | G06F 16/9027 |

* cited by examiner

DISPLAY SYSTEMS AND METHODS FOR CORRECTING DRIFTS IN CAMERA POSES

TECHNICAL FIELD

The present disclosure relates to display systems for correcting drifts in camera poses. Moreover, the present disclosure also relates to methods of correcting drifts in camera poses.

BACKGROUND

An extended-reality (XR) device needs to know its pose within a real-world environment continuously, so as to be able to determine a location of virtual content in an XR environment. Accurate estimation of the device pose is very important, because any erroneous estimates result in an incorrect movement of the virtual content in the XR environment.

In particular, mixed-reality (MR) applications rely on accurate tracking of the device pose to position and align virtual objects with Video See-Through (VST) images captured by cameras mounted on the XR device. For example, imagine a virtual coffee cup placed on top of a real table in the XR environment. If the device pose is inaccurate or drifts from an actual device pose, the virtual coffee cup would appear to float and move about, instead of appearing sitting stably on top of the real table. Such an incorrect movement of the virtual coffee cup is immediately visible to the user, thereby breaking the user's immersion in the XR environment. Therefore, it is imperative in the MR applications that the device pose is measured accurately.

There exist several conventional techniques for tracking the device pose. These conventional techniques can be divided into outside-in tracking techniques and inside-out tracking techniques. The outside-in tracking techniques employ detectors (for example, such as an infra-red (IR) camera, an IR transceiver, a visible light camera, a Radio Frequency Identification (RFID) reader) to detect at least one detectable object (for example, such as an active IR Light-Emitting Diode (LED), a visible LED, a laser illuminator, a Quick Response (QR) code, an ArUco marker, an RFID marker and the like). When the at least one detectable object is arranged in the real-world environment, the detectors are arranged on the XR device, and vice versa. On the other hand, the inside-out tracking techniques employ sensors (for example, such as an Inertial Measurement Unit (IMU), a Red-Green-Blue (RGB) camera and the like) of the XR device only. For example, consecutive images captured by an RGB camera can be processed to identify visible features; the device pose can then be fit to individual images, such that a movement and location of the visible features matches the device pose.

However, these conventional techniques suffer from several disadvantages. Firstly, each of the conventional techniques has various sources of error and, therefore, is not able to track the device pose accurately. For example, if the XR device is moved along a straight trajectory, its pose estimate would follow a slightly-distorted path with respect to time, instead of a straight path.

Secondly, such inaccurate tracking of the device pose is not optimal for MR applications. While the outside-in tracking techniques are widely adopted in the industry, their device pose estimates often drift from actual device poses, thereby making them only suitable for virtual-reality (VR) applications where the user has no physical frame of reference.

Thirdly, inside-out tracking techniques that employ cameras mounted on the XR device suffer from one or more of following problems: (i) some features may not be visible in consecutive images, (ii) physically different features may be detected incorrectly as a same feature, (iii) some features may belong to moving objects (for example, such as a person walking by or waving her/his hands in front of the cameras), (iv) there might not be enough features available to facilitate a reliable fitting of the device pose. These problems manifest in degenerate pose estimates, which are often not on-par with the outside-in tracking techniques.

Fourthly, in such inside-out tracking techniques, device poses can only be measured at a rate that is equal to a framerate of the cameras (for example, such as 60 frames per second, 90 frames per second and so on), which is much slower than a rate at which other tracking techniques can measure the device pose (for example, such as 1000 hertz).

SUMMARY

The present disclosure seeks to provide a display system for correcting a drift in camera poses. The present disclosure also seeks to provide a method of correcting a drift in camera poses. Moreover, the present disclosure also seeks to provide a solution to the existing problems of an inappropriate placement of and an unrealistic movement of virtual object(s) in an extended-reality environment caused due to drifts in measured camera poses.

In one aspect, an embodiment of the present disclosure provides a display system comprising:
a display apparatus comprising at least one image renderer and at least one camera;
means for tracking a pose of the at least one camera; and
at least one processor configured to:
   control the at least one camera to capture a plurality of images of a real-world environment, whilst processing tracking data obtained from said means to determine a given camera pose from which a given image is captured, wherein the given camera pose is determined in a global coordinate system;
   extract a plurality of first features from at least one first image from amongst the plurality of images;
   determine a relative pose of a given first feature with respect to the at least one camera;
   determine a pose of the given first feature in the global coordinate system, based on the relative pose of the given first feature with respect to the at least one camera and a first camera pose from which the at least one first image is captured;
   extract a plurality of second features from at least one second image from amongst the plurality of images;
   determine a relative pose of a given second feature with respect to the at least one camera;
   determine a pose of the given second feature in the global coordinate system, based on the relative pose of the given second feature with respect to the at least one camera and a second camera pose from which the at least one second image is captured;
   identify a plurality of matching features between the plurality of first features and the plurality of second features;
   determine a given difference between a pose of a given matching feature determined based on the first camera pose and a pose of the given matching feature determined based on the second camera pose;

select, from amongst the plurality of matching features, matching features that satisfy a first predefined criterion that is based on the given difference;

generate a correction transform that when applied to the second camera pose yields a corrected second camera pose, wherein corrected differences between poses of the selected matching features determined based on the corrected second camera pose and corresponding poses of the selected matching features determined based on the first camera pose satisfy a second predefined criterion;

apply the correction transform to the second camera pose to determine the corrected second camera pose; and process the at least one second image, based on the corrected second camera pose, to generate at least one extended-reality image to be rendered via the at least one image renderer of the display apparatus.

In another aspect, an embodiment of the present disclosure provides a method comprising:

capturing a plurality of images of a real-world environment via at least one camera of a display apparatus, whilst processing tracking data, obtained from means for tracking a pose of the at least one camera, to determine a given camera pose from which a given image is captured, wherein the given camera pose is determined in a global coordinate system;

extracting a plurality of first features from at least one first image from amongst the plurality of images;

determining a relative pose of a given first feature with respect to the at least one camera;

determining a pose of the given first feature in the global coordinate system, based on the relative pose of the given first feature with respect to the at least one camera and a first camera pose from which the at least one first image is captured;

extracting a plurality of second features from at least one second image from amongst the plurality of images;

determining a relative pose of a given second feature with respect to the at least one camera;

determining a pose of the given second feature in the global coordinate system, based on the relative pose of the given second feature with respect to the at least one camera and a second camera pose from which the at least one second image is captured;

identifying a plurality of matching features between the plurality of first features and the plurality of second features;

determining a given difference between a pose of a given matching feature determined based on the first camera pose and a pose of the given matching feature determined based on the second camera pose;

selecting, from amongst the plurality of matching features, matching features that satisfy a first predefined criterion that is based on the given difference;

generating a correction transform that when applied to the second camera pose yields a corrected second camera pose, wherein corrected differences between poses of the selected matching features determined based on the corrected second camera pose and corresponding poses of the selected matching features determined based on the first camera pose satisfy a second predefined criterion;

applying the correction transform to the second camera pose to determine the corrected second camera pose; and processing the at least one second image, based on the corrected second camera pose, to generate at least one extended-reality image to be rendered via at least one image renderer of the display apparatus.

Embodiments of the present disclosure substantially eliminate or at least partially address the aforementioned problems in the prior art, and enable an appropriate placement of and a realistic movement of a given virtual object in an extended-reality (XR) environment, based on drift-corrected camera poses, during generation of XR images, thereby providing a user with an immersive experience of the XR environment.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
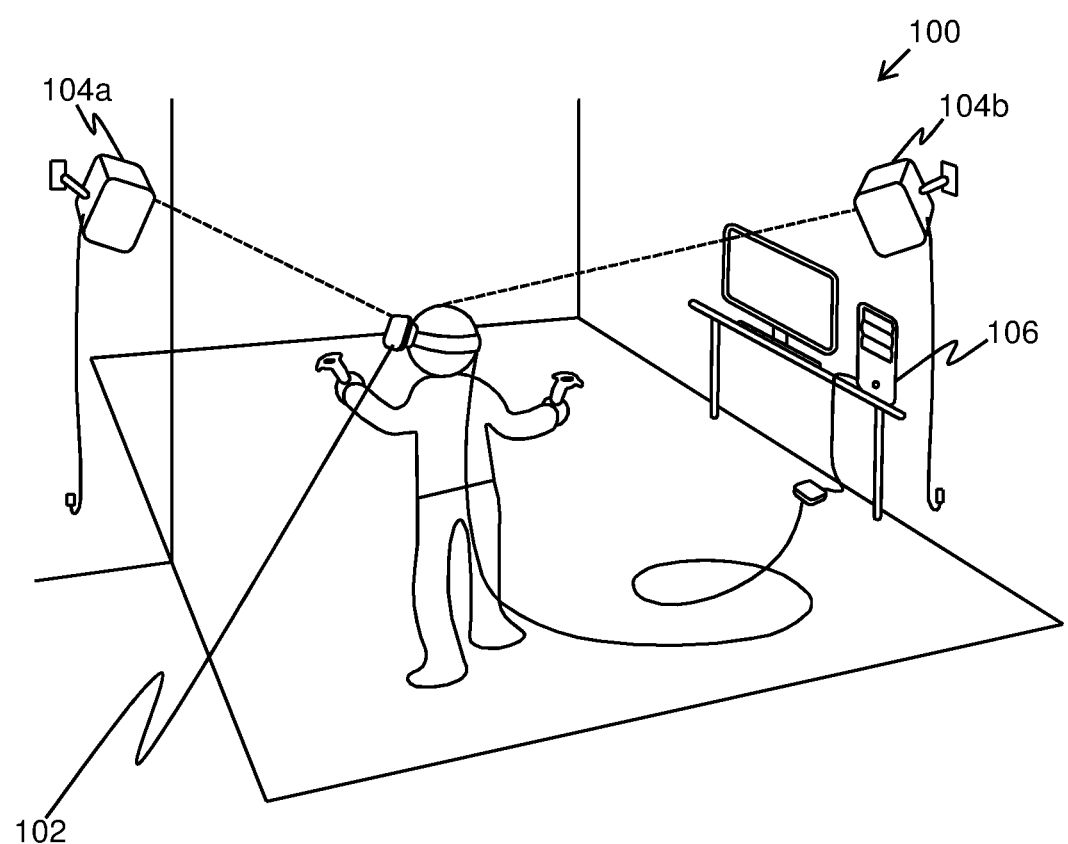
FIG. 1 is a schematic illustration of an environment in which a display system pursuant to embodiments of the present disclosure may be implemented.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a display system comprising:

a display apparatus comprising at least one image renderer and at least one camera;
means for tracking a pose of the at least one camera; and
at least one processor configured to:
  control the at least one camera to capture a plurality of images of a real-world environment, whilst processing tracking data obtained from said means to determine a given camera pose from which a given image is captured, wherein the given camera pose is determined in a global coordinate system;
  extract a plurality of first features from at least one first image from amongst the plurality of images;
  determine a relative pose of a given first feature with respect to the at least one camera;
  determine a pose of the given first feature in the global coordinate system, based on the relative pose of the given first feature with respect to the at least one camera and a first camera pose from which the at least one first image is captured;
  extract a plurality of second features from at least one second image from amongst the plurality of images;
  determine a relative pose of a given second feature with respect to the at least one camera;
  determine a pose of the given second feature in the global coordinate system, based on the relative pose of the given second feature with respect to the at least one camera and a second camera pose from which the at least one second image is captured;
  identify a plurality of matching features between the plurality of first features and the plurality of second features;
  determine a given difference between a pose of a given matching feature determined based on the first camera pose and a pose of the given matching feature determined based on the second camera pose;
  select, from amongst the plurality of matching features, matching features that satisfy a first predefined criterion that is based on the given difference;
  generate a correction transform that when applied to the second camera pose yields a corrected second camera pose, wherein corrected differences between poses of the selected matching features determined based on the corrected second camera pose and corresponding poses of the selected matching features determined based on the first camera pose satisfy a second predefined criterion;
  apply the correction transform to the second camera pose to determine the corrected second camera pose; and
  process the at least one second image, based on the corrected second camera pose, to generate at least one extended-reality image to be rendered via the at least one image renderer of the display apparatus.

In another aspect, an embodiment of the present disclosure provides a method comprising:
  capturing a plurality of images of a real-world environment via at least one camera of a display apparatus, whilst processing tracking data, obtained from means for tracking a pose of the at least one camera, to determine a given camera pose from which a given image is captured, wherein the given camera pose is determined in a global coordinate system;
  extracting a plurality of first features from at least one first image from amongst the plurality of images;
  determining a relative pose of a given first feature with respect to the at least one camera;
  determining a pose of the given first feature in the global coordinate system, based on the relative pose of the given first feature with respect to the at least one camera and a first camera pose from which the at least one first image is captured;
  extracting a plurality of second features from at least one second image from amongst the plurality of images;
  determining a relative pose of a given second feature with respect to the at least one camera;
  determining a pose of the given second feature in the global coordinate system, based on the relative pose of the given second feature with respect to the at least one camera and a second camera pose from which the at least one second image is captured;
  identifying a plurality of matching features between the plurality of first features and the plurality of second features;
  determining a given difference between a pose of a given matching feature determined based on the first camera pose and a pose of the given matching feature determined based on the second camera pose;
  selecting, from amongst the plurality of matching features, matching features that satisfy a first predefined criterion that is based on the given difference;
  generating a correction transform that when applied to the second camera pose yields a corrected second camera pose, wherein corrected differences between poses of the selected matching features determined based on the corrected second camera pose and corresponding poses of the selected matching features determined based on the first camera pose satisfy a second predefined criterion;
  applying the correction transform to the second camera pose to determine the corrected second camera pose; and
  processing the at least one second image, based on the corrected second camera pose, to generate at least one extended-reality image to be rendered via at least one image renderer of the display apparatus.

Embodiments of the present disclosure provide the aforementioned display system and method. The display system disclosed herein corrects a drift in a camera pose that is determined based on the tracking data obtained from the aforementioned means. The display system then generates an extended-reality (XR) image based on the corrected camera pose. This overcomes the aforementioned problems in the prior art. In particular, the display system reduces (for example, minimizes) errors caused by the drift in the camera pose. Pursuant to embodiments of the present disclosure, such drift correction performed prior to the generation of the XR image results in an appropriate placement of and a realistic movement of a given virtual object in an XR environment. Therefore, a user of the display apparatus is provided with an immersive experience of the XR environment, which improves the user's experience of using the display apparatus.

It will be appreciated that the display system corrects the drift in camera poses and produces XR images based on the corrected camera poses in real time or near real time.

Throughout the present disclosure, the term "display apparatus" refers to a specialized equipment that is employed to present an XR environment to the user when the display apparatus in operation is worn by the user on his/her head. The display apparatus acts as a device (for example, such as an XR headset, a pair of XR glasses and the like) that is operable to present a visual scene of an XR environment to the user. It will be appreciated that the display system produces a sequence of XR images for the display apparatus, wherein the sequence of XR images, when rendered via the at least one image renderer of the display apparatus, creates the visual scene of the XR environment.

It will be appreciated that the term "extended reality" encompasses virtual reality, augmented reality, mixed reality and the like.

Optionally, when generating a given XR image, at least one virtual object is embedded in the real-world environment to produce the XR environment. In such a case, the given XR image could be an Augmented-Reality (AR) image, a Mixed-Reality (MR) image or similar. As an example, the given XR image may be representative of a real-world object (for example, such as a table) and a virtual object (for example, such as a flower vase placed on top of the table).

Alternatively, optionally, when generating a given XR image, at least one virtual object is embedded in a virtual environment to produce the XR environment. In such a case, the given XR image is a Virtual-Reality (VR) image.

Throughout the present disclosure, the term "image renderer" refers to equipment that, in operation, renders the sequence of XR images produced by the display system. Optionally, a given image renderer is implemented as a display. Examples of the display include, but are not limited to, a Liquid Crystal Display (LCD), a Light-Emitting Diode (LED)-based display, an Organic LED (OLED)-based display, a micro OLED-based display, an Active Matrix OLED (AMOLED)-based display, and a Liquid Crystal on Silicon (LCoS)-based display. Alternatively, optionally, the given image renderer is implemented as a projector. In this regard, a given XR image is projected onto a projection screen or directly onto a retina of the user's eyes. Examples of the projector include, but are not limited to, an LCD-based projector, an LED-based projector, an OLED-based projector, an LCoS-based projector, a Digital Light Processing (DLP)-based projector, and a laser projector.

It will be appreciated that the term "at least one image renderer" refers to "one image renderer" in some implementations, and "a plurality of image renderers" in other implementations. In some implementations, the at least one image renderer comprises a single image renderer that is used on a shared basis for both eyes of the user. In other implementations, the at least one image renderer comprises at least one first image renderer and at least one second image renderer that are used for a first eye and a second eye of the user, respectively.

Throughout the present disclosure, the term "camera" refers to an equipment that is operable to detect and process light received from a real-world environment, so as to capture a given image of the real-world environment. Optionally, the at least one camera comprises a camera chip, wherein the light received from the real-world environment is directed by at least one optical element onto a photosensitive surface of the camera chip, thereby enabling the at least one camera to capture the given image of the real-world environment. Optionally, the at least one camera is implemented as at least one of: a Red-Green-Blue (RGB) camera, an RGB-Depth (RGB-D) camera, a stereo camera, a plenoptic camera.

It will be appreciated that the term "at least one camera" refers to "one camera" in some implementations, and "a plurality of cameras" in other implementations. In some implementations, the at least one camera comprises a stereo camera having at least two lenses with a dedicated camera chip per lens. In such implementations, the stereo camera is employed to capture two offset images (namely, a pair of stereo images) of the real-world environment, which are then processed to generate two offset XR images—one for the first eye of the user and another for the second eye of the user. In other implementations, the at least one camera comprises a plurality of cameras (namely, two or more cameras).

Throughout the present disclosure, the term "at least one first image" refers to a first pair of stereo images that are captured from the first camera pose; likewise, the term "at least one second image" refers to a second pair of stereo images that are captured from the second camera pose. It will be appreciated that the at least one camera is arranged to capture the plurality of images of the real-world environment from a perspective of the user's eyes, wherein the plurality of images are utilized to provide a Video See-Through (VST) experience to the user. In this regard, the at least one camera is arranged on an outer surface of the display apparatus facing the real-world environment.

Throughout the present disclosure, the term "means for tracking the pose of the at least one camera" refers to specialized equipment that is employed to detect and/or follow the pose (namely, a position and orientation) of the at least one camera within the real-world environment. In practice, the aforesaid means is actually employed to track a pose of the display apparatus; the pose of the at least one camera is then determined from the pose of the display apparatus based on a position of the at least one camera on the display apparatus.

Pursuant to embodiments of the present disclosure, the aforesaid means is implemented as a true six Degrees of Freedom (6DoF) tracking system. In other words, said means tracks both the position and the orientation of the at least one camera within a three-dimensional (3D) space of the real-world environment, which is represented by the aforementioned global coordinate system. In particular, said means is configured to track translational movements (namely, surge, heave and sway movements) and rotational movements (namely, roll, pitch and yaw movements) of the at least one camera within the 3D space.

The aforesaid means could be implemented as an internal component of the display apparatus, as a tracking system external to the display apparatus, or as a combination thereof.

As an internal component of the display apparatus, said means could be implemented as at least one of: an accelerometer, a gyroscope, an Inertial Measurement Unit (IMU), a Timing and Inertial Measurement Unit (TIMU).

As an external tracking system, said means could be implemented as at least one detector that is employed to detect at least one detectable object. When the at least one detectable object is arranged in the real-world environment, the at least one detector is arranged on the display apparatus, and vice versa. Optionally, in this regard, the at least one detectable object is implemented as at least one marker (for example, such as an active infra-red (IR) LED, a visible LED, a laser illuminator, a Quick Response (QR) code, an ArUco marker, a Radio Frequency Identification (RFID) marker and the like), whereas the at least one detector is implemented as at least one of: an IR camera, an IR transceiver, a visible light camera, an RFID reader.

In an example, said means may be implemented as Valve Corporation's SteamVR® tracking, where active lighthouses (namely, detectable objects) sending infrared signals are installed at fixed locations in the real-world environment in which the display apparatus is being used. In such a case, the display apparatus comprises detectors that detect these infrared signals and determine the pose (namely, the position and orientation) of the display apparatus relative to the fixed locations of the lighthouses.

In another example, said means may be implemented as a magnetic tracking system (for example, such as magnetic tracking from Polhemus), where an active magnetic field is generated using a transmitter in the real-world environment, and at least one receiver that is capable of sensing the magnetic field is installed into the display apparatus.

In yet another example, said means may be implemented as an optical outside-in tracking technique (for example, such as OptiTrack™ and ART tracking), where the display apparatus is fitted with IR retroreflective markers or IR LEDs, and at least one IR camera is installed in the real-world environment to capture IR light reflected from the markers or emitted by the IR LEDs.

Throughout the present disclosure, the term "processor" refers to hardware, software, firmware or a combination of these, suitable for controlling the operation of the display system. The at least one processor is communicably coupled with the at least one image renderer, the at least one camera and the aforesaid means wirelessly and/or in a wired manner. It will be appreciated that the term "at least one processor" refers to "one processor" in some implementations, and "a plurality of processors" in other implementations. In some implementations, the at least one processor is implemented as a processor of the display apparatus. In other implementations, the at least one processor is implemented as the processor of the display apparatus and a processor of an external computing device, wherein the external computing device is communicably coupled with the display apparatus wirelessly or in a wired manner. In such a case, at least a part of all the aforementioned processing tasks of the at least one processor is performed at the processor of the external computing device. This considerably reduces processing burden on the processor of the display apparatus.

Next, there will now be described the aforementioned processing tasks of the at least one processor.

Optionally, the at least one processor is configured to employ at least one image-processing algorithm to extract features from a given image from amongst the plurality of images. Examples of the features include, but are not limited to, edges, corners, blobs and ridges.

It will be appreciated that feature extraction is well-known in the art. Examples of the at least one image-processing algorithm include, but are not limited to:
 an edge-detection algorithm (for example, such as Canny edge detector, Deriche edge detector and the like),
 a corner-detection algorithm (for example, such as Harris & Stephens corner detector, Shi-Tomasi corner detector, Features from Accelerated Segment Test (FAST) corner detector and the like),
 a blob-detection algorithm (for example, such as Laplacian of Gaussian (LoG)-based blob detector, Difference of Gaussians (DoG)-based blob detector, Maximally Stable Extremal Regions (MSER) blob detector and the like),
 a feature descriptor algorithm (for example, such as Binary Robust Independent Elementary Features (BRIEF), Gradient Location and Orientation Histogram (GLOH), Histogram of Oriented Gradients (HOG) and the like), and
 a feature detector algorithm (for example, such as Scale-Invariant Feature Transform (SIFT), Oriented FAST and rotated BRIEF (ORB), Speeded Up Robust Features (SURF) and the like).

Moreover, optionally, the display system comprises a data storage whereat information pertaining to the features extracted from the given image are stored at least temporarily. Optionally, the data storage is implemented as a data memory of the display apparatus or a data memory of the aforementioned external computing device.

Optionally, the information pertaining to the features comprises feature vectors. A given feature vector describes a given feature. Hereinabove, the term "feature vector" refers to an n-dimensional vector of numerical values that describe various characteristic attributes of a given feature. The various characteristic attributes may, for example, comprise at least one of: a position, an orientation, a probability, a quality of representation, a unique identifier, a feature type, a shape, a size, a color, an area, a skewness, a local histogram, a Gradient Location-Orientation Histogram (GLOH). It will be appreciated that feature vectors are well-known in the art.

Optionally, when extracting the features from the given image, the at least one processor is configured to:
 sort the features based on a uniqueness and a descriptiveness of the features; and
 retain, from amongst the sorted features, features that satisfy a third predefined criterion based on the uniqueness and the descriptiveness.

This enables retaining only those features that can be tracked reliably in subsequent images. Optionally, in this regard, a uniqueness and a descriptiveness of a given feature are determined based upon a comparison between characteristic attributes of the given feature and characteristic attributes of other given features. Hereinabove, the term "uniqueness" generally refers to a measure of how well a given feature of a given feature type may be recognized and distinguished from other features of the given feature type, whereas the term "descriptiveness" generally refers to a measure of how well the given feature is described. Optionally, the given feature satisfies the third predefined criterion when the given feature is amongst a predefined number of most unique and descriptive features from amongst all the features. As an example, the features may be arranged in a descending order of their descriptiveness as follows: a blob with certain shape parameters, a corner in a central portion of the given image, a corner in a peripheral portion of the given image, an edge, and so on.

Beneficially, the plurality of first features comprise features that are common in the first pair of stereo images. Likewise, the plurality of second features comprise features that are common in the second pair of stereo images.

Furthermore, optionally, the at least one processor is configured to:
 generate a first depth map and a second depth map of the real-world environment from the first camera pose and the second camera pose, respectively; and
 utilize the first depth map and the second depth map when determining the relative pose of the given first feature and the relative pose of the given second feature with respect to the at least one camera, respectively.

Optionally, the plurality of images comprise pairs of stereo images, wherein, when generating a given depth map, the at least one processor is configured to match pixels of a given pair of stereo images that represent a given three-dimensional point in the real-world environment and determine binocular disparities between matching pixels of the given pair of stereo images.

Alternatively, optionally, the display apparatus further comprises a depth camera, wherein, when generating the given depth map, the at least one processor is configured to control the depth camera to capture a given depth image of the real-world environment from the given camera pose. Examples of the depth camera include, but are not limited to, an RGB-D camera, a ranging camera, a Light Detection and Ranging (LiDAR) camera, a flash LiDAR camera, a Time-of-Flight (ToF) camera, a Sound Navigation and Ranging (SONAR) camera, a laser rangefinder, a stereo camera, a plenoptic camera, an infrared camera, a structured-light scanner, and an ultrasound imaging equipment.

It will be appreciated that the given depth map is indicative of an optical depth of a given feature in the real-world environment, the given feature being extracted from the given image of the real-world environment. This enables the at least one processor to determine a relative pose of the given feature with respect to the at least one camera.

Moreover, it will be appreciated that the given camera pose is determined in the aforementioned global coordinate system based on the tracking data obtained from said means. Therefore, once the relative pose of the given feature with respect to the at least one camera is determined, a pose of the given feature in the global coordinate system can be determined. Pursuant to embodiments of the present disclosure, the pose of the given feature in the global coordinate system is determined based on the relative pose of the given feature with respect to the at least one camera and the given camera pose from which the given image is captured.

Throughout the present disclosure, the term "pose" refers to both position and orientation. Thus, the pose of the given feature comprises 3D position and 3D orientation of the given feature within the aforementioned 3D space of the real-world environment, which is represented by the global coordinate system. Optionally, the global coordinate system has a predefined origin and three coordinate axes, for example, such as X, Y and Z axes. Optionally, the 3D position of the given feature is expressed as (x, y, z) position coordinates along the X, Y and Z axes, respectively. Optionally, the 3D orientation of the given feature is expressed as at least one of: Euler angles, quaternions, rotation matrices, axis angles. It will be appreciated that other conventions for expressing the pose of the given feature in the 3D space and representing all 6DoF (namely, three translational degrees of freedom and three rotational degrees of freedom) can be employed alternatively.

Furthermore, the plurality of matching features (identified between the plurality of first features and the plurality of second features) are features that are common in the plurality of first features and the plurality of second features (extracted from the at least one first image and the at least one second image, respectively). Such identification of matching features enables the display system to track features that are common in a sequence of images, which are typically captured from nearby camera poses, namely camera poses that have not changed drastically.

The aforementioned given difference is then determined between the pose of the given matching feature determined based on the first camera pose (hereinafter referred to as the "first feature pose", for the sake of convenience only) and the pose of the given matching feature determined based on the second camera pose (hereinafter referred to as the "second feature pose", for the sake of convenience only). Such a difference is determined for each of the plurality of matching features.

The first feature pose comprises a first position and a first orientation of the given matching feature determined based on the first camera pose. Likewise, the second feature pose comprises a second position and a second orientation of the given matching feature determined based on the second camera pose. As the given matching feature is obtained after feature extraction from and feature matching between the at least one first image and the at least one second image, the given matching feature beneficially represents an invariant feature that is at least temporarily stationary in the real-world environment. Typically, the given matching feature would have only one correct position and orientation in the 3D space of the real-world environment during a given time period when the at least one first image and the at least one second image are captured. However, a drift in measurements of camera poses (tracked using the aforementioned means) results in the given difference between the first position and/or the first orientation of the given matching feature and the second position and/or the second orientation of the given matching feature. Thus, if there is a drift in the measurements of the camera poses, the plurality of matching features would have a systematic change in their respective poses (namely, a systematic rotational and/or translational offset in the poses).

Optionally, the given difference comprises a rotational difference between the first orientation and the second orientation. Alternatively, optionally, the given difference comprises a translational difference between the first position and the second position as well as the rotational difference between the first orientation and the second orientation. Yet alternatively, optionally, the given difference comprises the translational difference between the first position and the second position.

Optionally, the translational difference is determined as a Euclidean distance between the first position and the second position. As an example, if the first position and the second position are represented by (x, y, z) and (x+a, y+b, z+c), respectively, values of 'a', 'b' and 'c' represent respective changes in the position coordinates (namely, increments or decrements) along the X, Y and Z axes, respectively; the Euclidean distance can be calculated as a square root of a sum of squares of said changes in the position coordinates.

Optionally, the rotational difference is determined as a difference between first Euler angles representing the first orientation and second Euler angles representing the second orientation. Alternatively, optionally, the rotational difference is determined as a difference between a first quaternion representing the first orientation and a second quaternion representing the second orientation. Yet alternatively, optionally, the rotational difference is determined as a difference between a first rotation matrix representing the first orientation and a second rotation matrix representing the second orientation. Still alternatively, optionally, the rotational difference is determined as a difference between a first axis angle representing the first orientation and a second axis angle representing the second orientation. It will be appreciated that determining such rotational differences is well-known in the art.

Moreover, from amongst the plurality of matching features, those matching features that satisfy the first predefined criterion (that is defined based on the given difference) are then selected. According to an embodiment, the given matching feature satisfies the first predefined criterion when a multiplicative inverse of a function of the given difference is greater than a first predefined threshold value. Optionally, the function is determined as at least one of: the given difference, a square of the given difference, a cube of the given difference. It will be appreciated that other variations, alternatives and modifications of the function can be employed alternatively. Optionally, the first predefined threshold value is defined based on the function. The first predefined threshold value may be either system defined or user defined.

According to another embodiment, the given matching feature satisfies the first predefined criterion when the multiplicative inverse of the function of the given difference is amongst a predefined number of highest multiplicative inverses of the function of respective differences determined for the plurality of matching features. Optionally, the predefined number lies in a range of 10 to 100. For example, the predefined number may be from 10, 20, 30, 40, 50, 60, 70, 80, 90 up to 20, 30, 40, 50, 60, 70, 80, 90, 100. The predefined number may be either system defined or user defined. Typically, there are thousands (for example, in an order of tens of thousands) of features in the plurality of matching features. Beneficially, the predefined number is defined to be merely a fraction (for example, such as approximately $1/100^{th}$, $1/1000^{th}$ or similar) of a total number of features in the plurality of matching features. As an example, the first predefined criterion may be defined such that the plurality of matching features are sorted in a descending order of the multiplicative inverses of the function of their respective differences and top 'N' number of matching features are then selected from amongst the sorted matching features, wherein 'N' represents the aforesaid predefined number.

According to yet another embodiment, the given matching feature satisfies the first predefined criterion when the aforesaid function of the given difference is smaller than a first other predefined threshold value. Optionally, the first other predefined threshold value is defined based on the function. The first other predefined threshold value may be either system defined or user defined.

According to still another embodiment, the given matching feature satisfies the first predefined criterion when the aforesaid function of the given difference is amongst the predefined number of lowest values of the function of the respective differences determined for the plurality of matching features.

It will be appreciated that the selected matching features (namely, the matching features that satisfy the first predefined criterion) are not merely a fraction of the total number of features in the plurality of matching features, but also are most robust features from amongst the plurality of matching features. Such a selection of the matching features enables the display system to generate the correction transform optimally, whilst reducing the processing burden on the at least one processor greatly.

Furthermore, optionally, the at least one processor is configured to generate the correction transform iteratively. Optionally, in this regard, when generating the correction transform, the at least one processor is configured to:
(a) select an initial correction transform;
(b) apply the initial correction transform to the second camera pose to generate an initial corrected second camera pose;
(c) determine poses of the selected matching features based on the initial corrected second camera pose (hereinafter referred to as the "initial corrected second feature poses", for the sake of convenience only) and corresponding poses of the selected matching features based on the first camera pose (hereinafter referred to as the "first feature poses", for the sake of convenience only);
(d) determine initial corrected differences between the initial corrected second feature poses and the corresponding first feature poses;
(e) update the initial correction transform if the initial corrected differences do not satisfy the second predefined criterion; and
(f) perform (b) to (e) using the updated correction transform iteratively, until the corrected differences between the corrected second feature poses and the first features poses satisfy the second predefined criterion.

Optionally, the correction transformation is a 4×4 transformation matrix. Alternatively, optionally, the correction transformation is a quaternion describing a rotational offset and/or a translational offset.

According to an embodiment, the corrected differences satisfy the second predefined criterion when a median of the corrected differences is smaller than a second predefined threshold value. According to another embodiment, the corrected differences satisfy the second predefined criterion when a mean of the corrected differences is smaller than the second predefined threshold value. The second predefined threshold value may be either system defined or user defined.

According to yet another embodiment, the corrected differences satisfy the second predefined criterion when a multiplicative inverse of the median of the corrected differences is greater than a second other predefined threshold value. According to still another embodiment, the corrected differences satisfy the second predefined criterion when a multiplicative inverse of the mean of the corrected differences is greater than the second other predefined threshold value. The second other predefined threshold value may be either system defined or user defined.

Pursuant to embodiments of the present disclosure, the correction transform is applied to the second camera pose to determine the corrected second camera pose, which is then utilized to process the at least one second image to generate the at least one XR image. When the at least one XR image is rendered via the at least one image renderer of the display apparatus, the user is presented with a truly immersive experience of the XR environment.

It will be appreciated that even though the correction transform is applied to measured camera poses (namely, camera poses determined based on the tracking data obtained from the aforesaid means) to determine corrected camera poses that are different from the measured camera poses, the corrected camera poses are still relatively close to the measured camera poses. Optionally, in this regard, the at least one processor is configured to take into account a maximum drift that is expected to occur in the measured camera poses when generating the correction transform.

Moreover, optionally, the at least one processor is configured to update the correction transform, based on a new camera pose from which at least one new image is captured. Optionally, in this regard, the correction transform is updated based on features extracted from the at least one new image and previous features, as described earlier.

Furthermore, optionally, the information pertaining to the features (that was stored previously at the data storage) is updated to add new features and/or to delete previous features that do not match with any of the features extracted from the at least one new image. As an example, features that pertain to real objects that have moved or become occluded would be deleted.

It will be appreciated that a given invariant feature 'A' may be common between multiple images. The given invariant feature 'A' would have many different poses (namely, positions and orientations in the global coordinate system) determined from different measured camera poses (namely, camera poses determined based on the tracking data obtained from the aforesaid means), because these measured camera poses have been drifting from correct camera poses (namely, actual camera poses). These camera poses have been measured at different time instants and optionally have associated timestamps. Optionally, a sliding mean or a sliding median of the different poses of the given invariant feature 'A' is determined to update, in the information pertaining to the features (stored at the data storage), the pose of the given invariant feature 'A' at least initially.

Optionally, once a corrected camera pose is determined (namely, by applying the correction transform to a given camera pose), a corrected pose of a given feature in the global coordinate system is determined based on the corrected camera pose. Optionally, the corrected pose of the given feature is then updated in the information pertaining to the features (stored at the data storage).

Optionally, the at least one processor is configured to update the correction transform repeatedly. According to an embodiment, the correction transform is updated each time at least one new image is captured using the at least one camera. As an example, if a framerate at which images are being captured by the at least one camera is 90 frames per second, the correction transform may be updated at a rate of 90 hertz, namely based on every image. According to another embodiment, the correction transform is updated after a predefined number of images are captured using the at least one camera. As an example, if the framerate is 90 frames per second, the correction transform may be updated at a rate of 10 hertz, namely based on every ninth image. As another example, considering the same framerate of 90 frames per second, the correction transform may be updated at a rate of 30 hertz, namely based on every third image.

Moreover, optionally, the at least one processor is configured to apply the correction transform to each camera pose that is determined based on the tracking data obtained from the aforesaid means. It will be appreciated that a rate at which camera poses are determined may be in an order of hundreds of hertz, whereas the rate at which the correction transform is updated may lie in a range of 10 to 100 hertz. As an example, Valve Corporation's SteamVR® tracking can be used to determine the camera poses at a rate of 1000 hertz approximately. Thus, a same correction transform is optionally applied to a sequence of camera poses until the correction transform is updated (namely, until a new correction transform is generated).

It will also be appreciated that a temporal coherency may be enforced when updating the correction transform. Optionally, in this regard, the correction transform is not allowed to change drastically between adjacent images in the sequence of images, as the sequence of images are typically captured from camera poses that have not changed drastically.

Furthermore, the present disclosure also relates to the method as described above. Various embodiments and variants disclosed above apply mutatis mutandis to the method.

According to an embodiment, the given matching feature satisfies the first predefined criterion when a multiplicative inverse of a function of the given difference is greater than a first predefined threshold value. According to another embodiment, the given matching feature satisfies the first predefined criterion when the multiplicative inverse of the function of the given difference is amongst a predefined number of highest multiplicative inverses of the function of respective differences determined for the plurality of matching features. According to yet another embodiment, the given matching feature satisfies the first predefined criterion when the function of the given difference is smaller than a first other predefined threshold value. According to still another embodiment, the given matching feature satisfies the first predefined criterion when the function of the given difference is amongst a predefined number of lowest values of the function of the respective differences determined for the plurality of matching features.

According to an embodiment, the corrected differences satisfy the second predefined criterion when a median of the corrected differences is smaller than a second predefined threshold value. According to another embodiment, the corrected differences satisfy the second predefined criterion when a mean of the corrected differences is smaller than the second predefined threshold value. According to yet another embodiment, the corrected differences satisfy the second predefined criterion when a multiplicative inverse of the median of the corrected differences is greater than a second other predefined threshold value. According to still another embodiment, the corrected differences satisfy the second predefined criterion when a multiplicative inverse of the mean of the corrected differences is greater than the second other predefined threshold value.

Optionally, the method further comprises generating the correction transform iteratively.

Optionally, the method further comprises updating the correction transform, based on a new camera pose from which at least one new image is captured.

Optionally, the method further comprises:
generating a first depth map and a second depth map of the real-world environment from the first camera pose and the second camera pose, respectively; and
utilizing the first depth map and the second depth map when determining the relative pose of the given first feature and the relative pose of the given second feature with respect to the at least one camera, respectively.

DETAILED DESCRIPTION OF THE DRAWINGS

Referring to FIG. 1, illustrated is a schematic illustration of an environment in which a display system 100 pursuant to embodiments of the present disclosure may be implemented. The display system 100 comprises a display apparatus 102 (for example, such as an XR headset), which comprises at least one image renderer (not shown) and at least one camera (not shown).

The display system 100 also comprises means for tracking a pose of the at least one camera. Optionally, said means comprises detectors (not shown) arranged on the display apparatus 102 and detectable objects 104a and 104b arranged at fixed locations in the environment. Alternatively, optionally, said means comprises detectors 104a and 104b arranged at fixed locations in the environment and detectable objects (not shown) arranged on the display apparatus 102.

The display system 100 further comprises at least one processor coupled in communication with the at least one image renderer, the at least one camera and said means. Optionally, the at least one processor is implemented as a processor of the display apparatus 102. Alternatively, optionally, the at least one processor is implemented as the processor of the display apparatus and a processor of an external computing device 106, wherein the external computing device 106 is coupled in communication with the display apparatus 102.

FIG. 1 is merely an example, which should not unduly limit the scope of the claims herein. A person skilled in the art will recognize many variations, alternatives and modifications of embodiments of the present disclosure.

Figure 2:
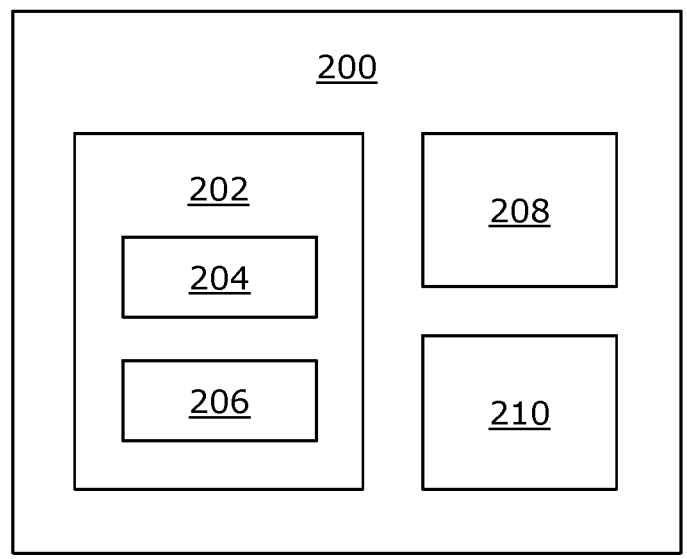
FIG. 2 is a block diagram of architecture of a display system for correcting a drift in camera poses, in accordance with an embodiment of the present disclosure.

Referring now to FIG. 2, illustrated is a block diagram of architecture of a display system 200 for correcting a drift in camera poses, in accordance with an embodiment of the present disclosure. The display system 200 comprises a display apparatus 202 comprising at least one image renderer (depicted as an image renderer 204) and at least one camera (depicted as a camera 206); means 208 for tracking a pose of the camera 206; and at least one processor (depicted as a processor 210).

Figure 3:
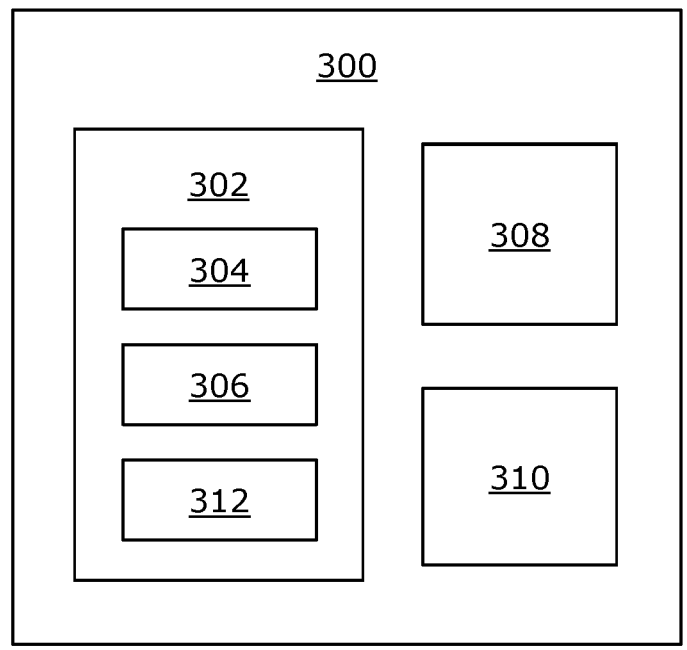
FIG. 3 is a block diagram of architecture of a display system for correcting a drift in camera poses, in accordance with another embodiment of the present disclosure.

Referring next to FIG. 3, illustrated is a block diagram of architecture of a display system 300 for correcting a drift in camera poses, in accordance with another embodiment of the present disclosure. The display system 300 comprises a display apparatus 302 comprising at least one image renderer (depicted as an image renderer 304) and at least one camera (depicted as a camera 306); means 308 for tracking a pose of the camera 306; and at least one processor (depicted as a processor 310). Optionally, the display apparatus 302 further comprises a depth camera 312.

It may be understood by a person skilled in the art that FIG. 2 and FIG. 3 include simplified architectures of the display system 200 and 300, respectively, for the sake of clarity, which should not unduly limit the scope of the claims herein. A person skilled in the art will recognize many variations, alternatives and modifications of embodiments of the present disclosure.

Figure 4A:
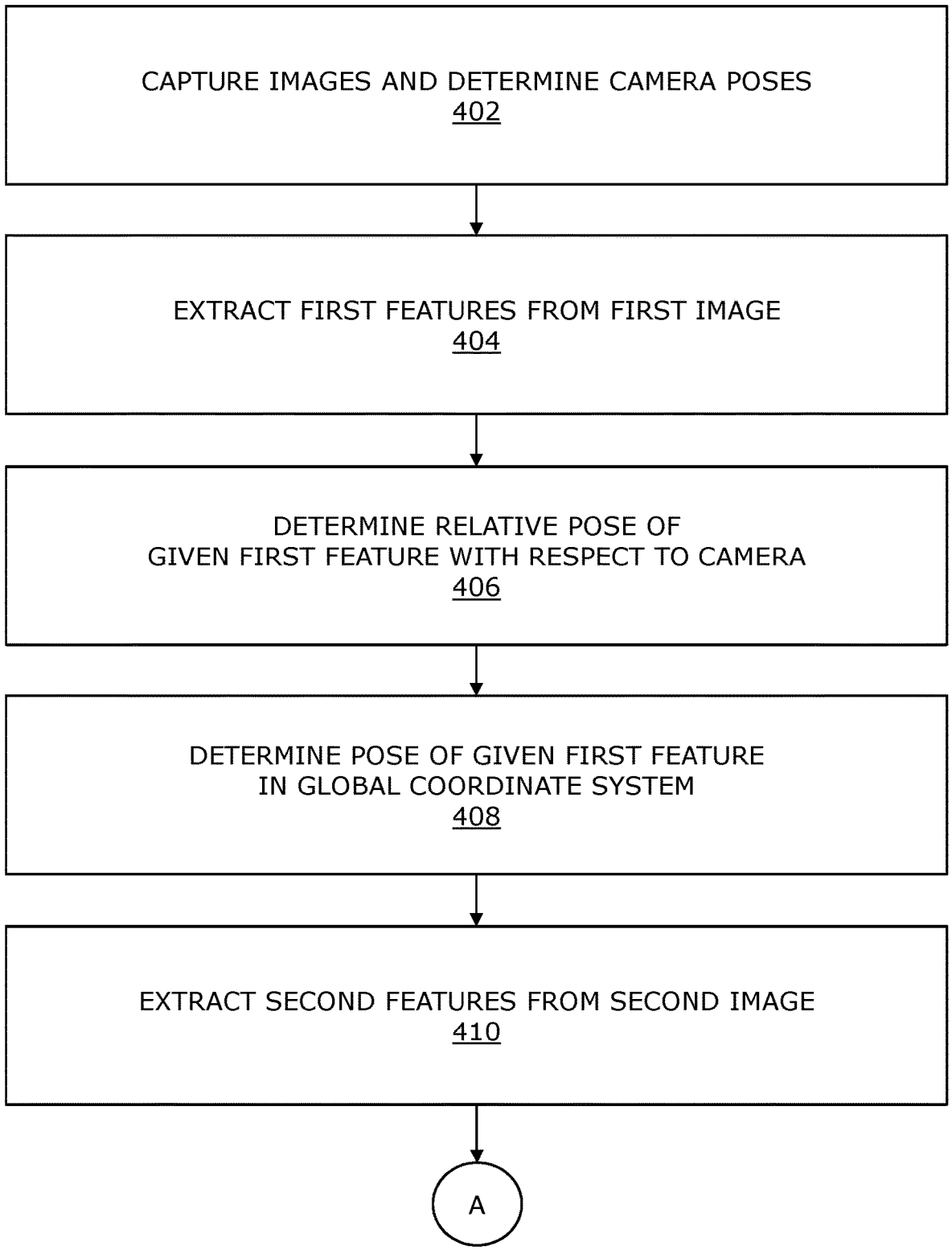
FIGS. 4A, 4B and 4C illustrate steps of a method of correcting a drift in camera poses, in accordance with an embodiment of the present disclosure.
Figure 4B:
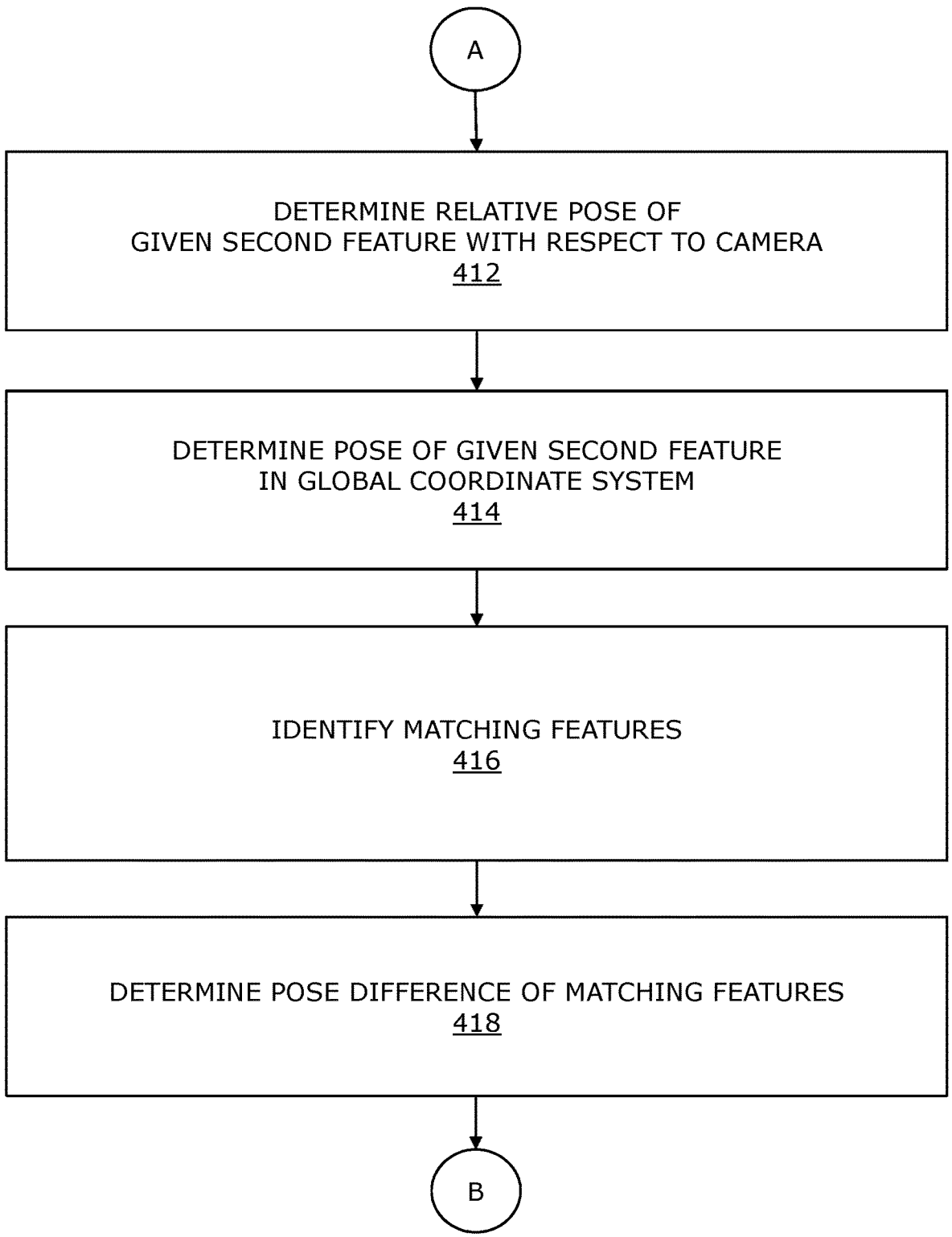
Figure 4C:
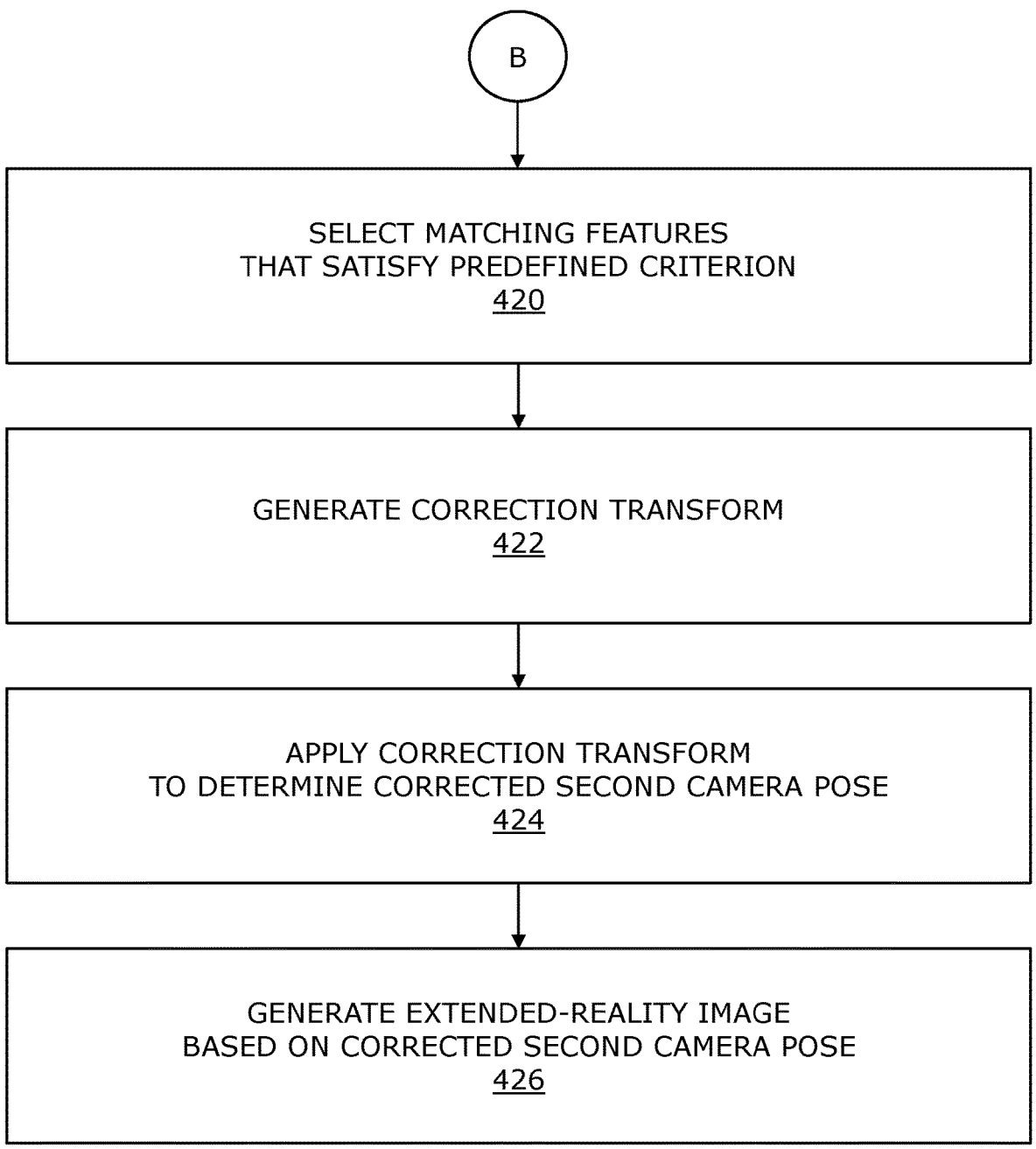

Referring to FIGS. 4A, 4B and 4C, illustrated are steps of a method of correcting a drift in camera poses, in accordance with an embodiment of the present disclosure.

At a step 402, a plurality of images of a real-world environment are captured via at least one camera, whilst processing tracking data to determine a given camera pose from which a given image is captured. The given camera pose is determined in a global coordinate system. At a step 404, a plurality of first features are extracted from at least one first image from amongst the plurality of images. At a step 406, a relative pose of a given first feature with respect to the at least one camera is determined. At a step 408, a pose of the given first feature is determined in the global coordinate system, based on the relative pose of the given first feature with respect to the at least one camera and a first camera pose from which the at least one first image is captured. At a step 410, a plurality of second features are extracted from at least one second image from amongst the plurality of images. At a step 412, a relative pose of a given second feature with respect to the at least one camera is determined. At a step 414, a pose of the given second feature is determined in the global coordinate system, based on the relative pose of the given second feature with respect to the at least one camera and a second camera pose from which the at least one second image is captured.

At a step 416, a plurality of matching features are identified between the plurality of first features and the plurality of second features. At a step 418, a given difference between a pose of a given matching feature determined based on the first camera pose and a pose of the given matching feature determined based on the second camera pose is determined. At a step 420, matching features that satisfy a first predefined criterion that is based on the given difference are selected from amongst the plurality of matching features.

At a step 422, a correction transform is generated that when applied to the second camera pose yields a corrected second camera pose, wherein corrected differences between poses of the selected matching features determined based on the corrected second camera pose and corresponding poses of the selected matching features determined based on the first camera pose satisfy a second predefined criterion. At a step 424, the correction transform is applied to the second camera pose to determine the corrected second camera pose. At a step 426, the at least one second image is processed, based on the corrected second camera pose, to generate at least one extended-reality image to be rendered at the at least one image renderer of the display apparatus.

The aforementioned steps are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

It will be appreciated that the terms "first" and "second" used herein do not denote any order, quantity or importance, but rather are used to distinguish one element from another.

What is claimed is:

1. A display system comprising:
    a display apparatus comprising at least one image renderer and at least one camera;
    means for tracking a pose of the at least one camera; and
    at least one processor configured to:
        control the at least one camera to capture a plurality of images of a real-world environment, whilst processing tracking data obtained from said means to determine a given camera pose from which a given image is captured, wherein the given camera pose is determined in a global coordinate system;
        extract a plurality of first features from at least one first image from amongst the plurality of images;
        determine a relative pose of a given first feature with respect to the at least one camera;
        determine a pose of the given first feature in the global coordinate system, based on the relative pose of the given first feature with respect to the at least one camera and a first camera pose from which the at least one first image is captured;
        extract a plurality of second features from at least one second image from amongst the plurality of images;
        determine a relative pose of a given second feature with respect to the at least one camera;
        determine a pose of the given second feature in the global coordinate system, based on the relative pose of the given second feature with respect to the at least one camera and a second camera pose from which the at least one second image is captured;
        identify a plurality of matching features between the plurality of first features and the plurality of second features;
        determine a given difference between a pose of a given matching feature determined based on the first camera pose and a pose of the given matching feature determined based on the second camera pose;
        select, from amongst the plurality of matching features, matching features that satisfy a first predefined criterion that is based on the given difference;
        generate a correction transform that when applied to the second camera pose yields a corrected second camera pose, wherein corrected differences between poses of the selected matching features determined based on the corrected second camera pose and corresponding poses of the selected matching features determined based on the first camera pose satisfy a second predefined criterion;

apply the correction transform to the second camera pose to determine the corrected second camera pose; and process the at least one second image, based on the corrected second camera pose, to generate at least one extended-reality image to be rendered via the at least one image renderer of the display apparatus.

2. The display system of claim 1, wherein the given matching feature satisfies the first predefined criterion when a multiplicative inverse of a function of the given difference is greater than a first predefined threshold value.

3. The display system of claim 1, wherein the given matching feature satisfies the first predefined criterion when a multiplicative inverse of a function of the given difference is amongst a predefined number of highest multiplicative inverses of the function of respective differences determined for the plurality of matching features.

4. The display system of claim 1, wherein the given matching feature satisfies the first predefined criterion when a function of the given difference is smaller than a first other predefined threshold value.

5. The display system of claim 1, wherein the given matching feature satisfies the first predefined criterion when a function of the given difference is amongst a predefined number of lowest values of the function of respective differences determined for the plurality of matching features.

6. The display system of claim 1, wherein the corrected differences satisfy the second predefined criterion when a median of the corrected differences is smaller than a second predefined threshold value.

7. The display system of claim 1, wherein the at least one processor is configured to generate the correction transform iteratively.

8. The display system of claim 1, wherein the at least one processor is configured to update the correction transform, based on a new camera pose from which at least one new image is captured.

9. The display system of claim 1, wherein the at least one processor is configured to:
generate a first depth map and a second depth map of the real-world environment from the first camera pose and the second camera pose, respectively; and
utilize the first depth map and the second depth map when determining the relative pose of the given first feature and the relative pose of the given second feature with respect to the at least one camera, respectively.

10. The display system of claim 9, wherein the plurality of images comprise pairs of stereo images, and wherein, when generating a given depth map, the at least one processor is configured to match pixels of a given pair of stereo images that represent a given three-dimensional point in the real-world environment and determine binocular disparities between matching pixels of the given pair of stereo images.

11. The display system of claim 9, wherein the display apparatus further comprises a depth camera, wherein, when generating a given depth map, the at least one processor is configured to control the depth camera to capture a given depth image of the real-world environment from the given camera pose.

12. A method comprising:
capturing a plurality of images of a real-world environment via at least one camera of a display apparatus, whilst processing tracking data, obtained from means for tracking a pose of the at least one camera, to determine a given camera pose from which a given image is captured, wherein the given camera pose is determined in a global coordinate system;
extracting a plurality of first features from at least one first image from amongst the plurality of images;
determining a relative pose of a given first feature with respect to the at least one camera;
determining a pose of the given first feature in the global coordinate system, based on the relative pose of the given first feature with respect to the at least one camera and a first camera pose from which the at least one first image is captured;
extracting a plurality of second features from at least one second image from amongst the plurality of images;
determining a relative pose of a given second feature with respect to the at least one camera;
determining a pose of the given second feature in the global coordinate system, based on the relative pose of the given second feature with respect to the at least one camera and a second camera pose from which the at least one second image is captured;
identifying a plurality of matching features between the plurality of first features and the plurality of second features;
determining a given difference between a pose of a given matching feature determined based on the first camera pose and a pose of the given matching feature determined based on the second camera pose;
selecting, from amongst the plurality of matching features, matching features that satisfy a first predefined criterion that is based on the given difference;
generating a correction transform that when applied to the second camera pose yields a corrected second camera pose, wherein corrected differences between poses of the selected matching features determined based on the corrected second camera pose and corresponding poses of the selected matching features determined based on the first camera pose satisfy a second predefined criterion;
applying the correction transform to the second camera pose to determine the corrected second camera pose; and
processing the at least one second image, based on the corrected second camera pose, to generate at least one extended-reality image to be rendered via at least one image renderer of the display apparatus.

13. The method of claim 12, wherein the given matching feature satisfies the first predefined criterion when a multiplicative inverse of a function of the given difference is greater than a first predefined threshold value.

14. The method of claim 12, wherein the given matching feature satisfies the first predefined criterion when a multiplicative inverse of a function of the given difference is amongst a predefined number of highest multiplicative inverses of the function of respective differences determined for the plurality of matching features.

15. The method of claim 12, wherein the given matching feature satisfies the first predefined criterion when a function of the given difference is smaller than a first other predefined threshold value.

16. The method of claim 12, wherein the given matching feature satisfies the first predefined criterion when a function of the given difference is amongst a predefined number of lowest values of the function of respective differences determined for the plurality of matching features.

17. The method of claim 12, wherein the corrected differences satisfy the second predefined criterion when a median of the corrected differences is smaller than a second predefined threshold value.

18. The method of claim 12, further comprising generating the correction transform iteratively.

19. The method of claim 12, further comprising updating the correction transform, based on a new camera pose from which at least one new image is captured.

20. The method of claim 12, further comprising:
generating a first depth map and a second depth map of the real-world environment from the first camera pose and the second camera pose, respectively; and
utilizing the first depth map and the second depth map when determining the relative pose of the given first feature and the relative pose of the given second feature with respect to the at least one camera, respectively.

* * * * *